United States Patent
Geppert et al.

(10) Patent No.: US 8,296,734 B2
(45) Date of Patent: Oct. 23, 2012

(54) SYSTEM AND METHOD FOR TESTING A SOFTWARE PRODUCT

(75) Inventors: Julius Geppert, Darmstadt (DE); Ralf Ruth, Mauer (DE)

(73) Assignee: Software AG, Darmstadt (DE)

( * ) Notice: Subject to any disclaimer, the term of this patent is extended or adjusted under 35 U.S.C. 154(b) by 1123 days.

(21) Appl. No.: 12/144,115

(22) Filed: Jun. 23, 2008

(65) Prior Publication Data

US 2009/0313606 A1 Dec. 17, 2009

(30) Foreign Application Priority Data

Jun. 11, 2008 (EP) ..................................... 08010593

(51) Int. Cl.
*G06F 9/44* (2006.01)
(52) U.S. Cl. ......................... 717/124; 717/101; 717/126
(58) Field of Classification Search .................... None
See application file for complete search history.

(56) References Cited

U.S. PATENT DOCUMENTS

| | | | |
|---|---|---|---|
| 7,055,067 B2 | 5/2006 | DiJoseph | |
| 7,174,541 B2 | 2/2007 | Muller et al. | |
| 7,210,066 B2 | 4/2007 | Mandava et al. | |
| 7,313,564 B2 * | 12/2007 | Melamed et al. | 717/124 |
| 7,721,252 B2 * | 5/2010 | Choi et al. | 717/104 |
| 7,757,121 B1 * | 7/2010 | Perron et al. | 714/26 |
| 7,761,841 B1 * | 7/2010 | Rexroad et al. | 717/100 |
| 7,934,127 B2 * | 4/2011 | Kelso | 714/38.1 |
| 8,078,924 B2 * | 12/2011 | Jibbe | 714/724 |
| 8,117,539 B2 * | 2/2012 | Sherman et al. | 715/255 |
| 2004/0073886 A1 * | 4/2004 | Irani | 717/101 |
| 2005/0166094 A1 * | 7/2005 | Blackwell et al. | 714/38 |
| 2005/0204201 A1 * | 9/2005 | Meenakshisundaram et al. | 714/38 |
| 2006/0064178 A1 * | 3/2006 | Butterfield et al. | 700/18 |
| 2006/0132297 A1 | 6/2006 | Carver et al. | |
| 2008/0184206 A1 * | 7/2008 | Vikutan | 717/127 |
| 2008/0275714 A1 * | 11/2008 | Martinez | 705/1 |
| 2009/0019427 A1 * | 1/2009 | Li et al. | 717/126 |
| 2009/0019428 A1 * | 1/2009 | Li et al. | 717/128 |

OTHER PUBLICATIONS

F. Bouquet, E. Jaffuel, B. Legeard, F. Peureux, and M. Utting. 2005. Requirements traceability in automated test generation: application to smart card software validation. SIGSOFT Softw. Eng. Notes 30, 4 (May 2005), 1-7.*

Aizenbud-Reshef, N.; Nolan, B. T.; Rubin, J.; Shaham-Gafni, Y.; , "Model traceability," IBM Systems Journal , vol. 45, No. 3, pp. 515-526, 2006 doi: 10.1147/sj.453.0515.*

(Continued)

*Primary Examiner* — Wei Zhen
*Assistant Examiner* — Matthew Brophy
(74) *Attorney, Agent, or Firm* — Meyertons Hood Kivlin Kowert & Goetzel, P.C.; Jeffrey C. Hood

(57) ABSTRACT

A system for testing at least one software product comprising a requirement loader and a test specification loader. The requirement loader is adapted for loading a plurality of requirements on the software product into a database. The test specification loader is adapted for loading a plurality of test specifications for the software product into the database, each test specification being related to one or more of the requirements. The test specification loader is further adapted for generating during loading of a test specification a virtual test specification in the database for each of the one or more related requirements, the virtual test specification comprising all test specifications for the respective requirement on the software product stored in the database.

15 Claims, 17 Drawing Sheets

OTHER PUBLICATIONS

Figure 1:
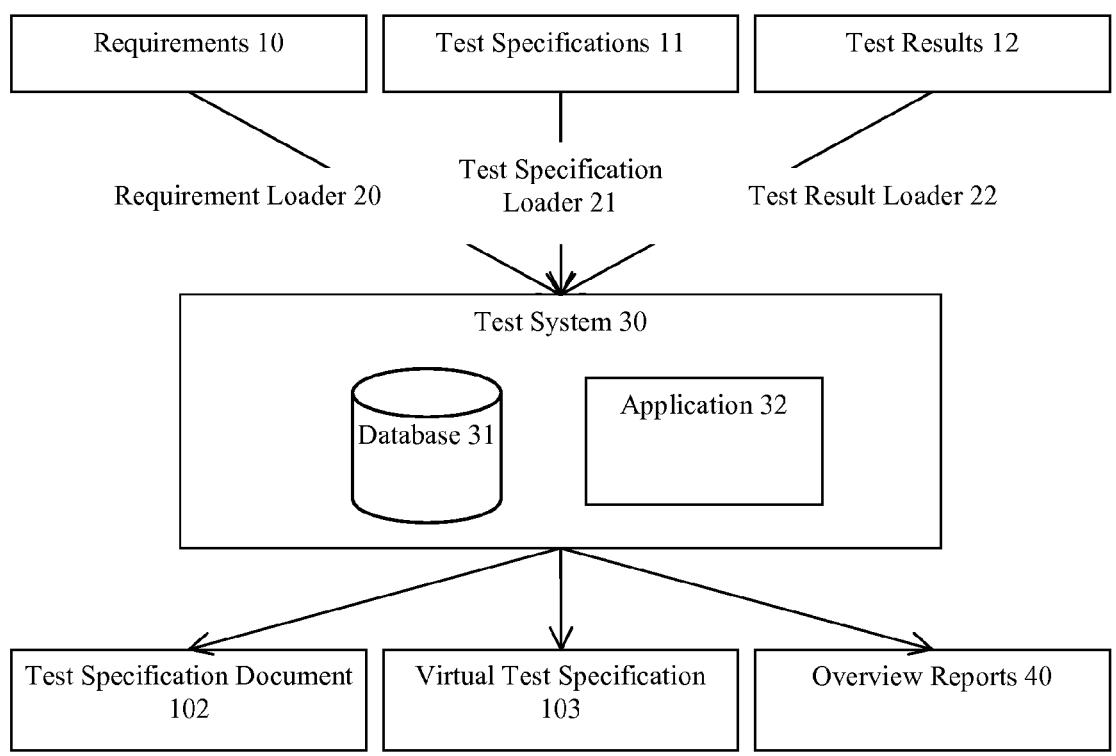

Cleland-Huang, J.; Zemont, G.; Lukasik, W.; , "A heterogeneous solution for improving the return on investment of requirements traceability," Requirements Engineering Conference, 2004. Proceedings. 12th IEEE International , vol., No., pp. 230- 239, Sep. 6-11, 2004 doi: 10.1109/ICRE.2004.1335680.*

Siti Rochimah, Wan M. N. Wan Kadir, and Abdul H. Abdullah. 2007. An Evaluation of Traceability Approaches to Support Software Evolution. In Proceedings of the International Conference on Software Engineering Advances (ICSEA '07). IEEE Computer Society, Washington, DC, USA, 19-. DOI=10.1109/ICSEA.2007.17 http://dx.doi.org/10.1109/ICSEA.2007.17.*

European search report for application No. EP 08010593, mailed Dec. 22, 2008, 10 Pages.

Linda H. Rosenberg, et al.; "Requirements, Testing, and Metrics"; Sixteenth Annual Pacific Northwest Software Conference Joint ASQ, Software Division's Eight International Conference on Software Quality; Oct. 14, 1998; 12 Pages.

\* cited by examiner

Fig. 4

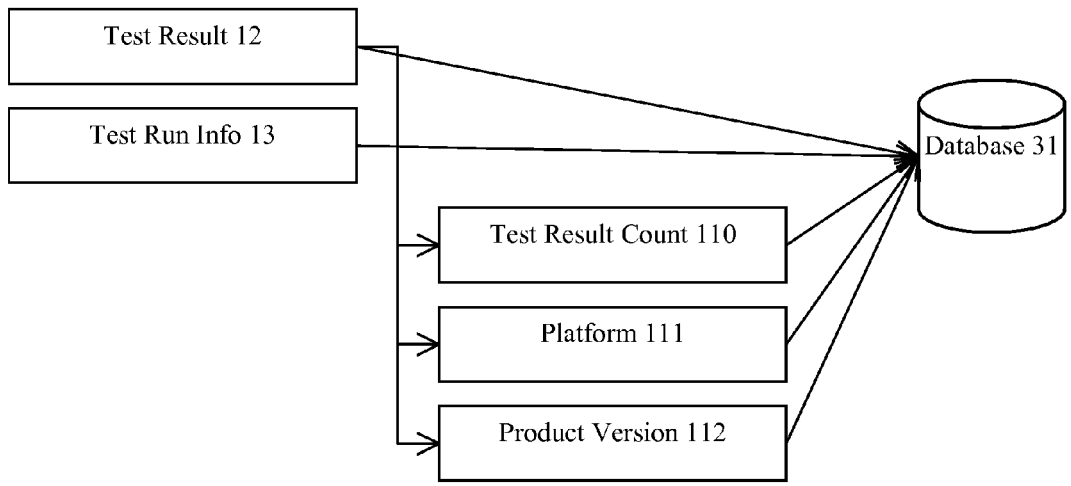

Fig. 5

```
5       <xs:complexType name = "TTestspec">
          <xs:sequence>
            <xs:element name = "description" type = "TDescription" minOccurs = "0"></xs:element>
            <xs:element name = "category" type = "TCategory" minOccurs = "0" maxOccurs =
10      "unbounded"></xs:element>
            <xs:element name = "scenario" type = "TScenario" maxOccurs = "unbounded"></xs:element>
            <xs:element name = "revisionHistory" type = "TRevisionHistory" minOccurs = "0"></xs:element>
15        </xs:sequence>
          <xs:attribute name = "id" type = "xs:ID" use = "required"></xs:attribute>
          <xs:attribute name = "title" type = "xs:string"></xs:attribute>
          <xs:attribute name = "project" type = "xs:string"></xs:attribute>
          <xs:attribute name = "product" type = "xs:string"></xs:attribute>
20        <xs:attribute name = "autotype" type = "xs:string"></xs:attribute>
          <xs:attribute name = "source" type = "xs:string"></xs:attribute>
        </xs:complexType>
```

Fig. 6

```
    <xs:complexType name = "TScenario">
      <xs:sequence>
        <xs:element name = "description" type = "TDescription" minOccurs =
5   "0"></xs:element>
        <xs:element name = "category" type = "TCategory" minOccurs = "0"
    maxOccurs = "unbounded"></xs:element>
        <xs:element name = "paramGroup" type = "TParamGroup" minOccurs
    = "0"></xs:element>
10      <xs:element name = "precondition" type = "TCondition" minOccurs =
    "0" maxOccurs = "unbounded"></xs:element>
        <xs:choice>
          <xs:element name = "scenario" type = "TScenario" maxOccurs =
    "unbounded"></xs:element>
15        <xs:element name = "testcase" type = "TTestCase" maxOccurs =
    "unbounded"></xs:element>
        </xs:choice>
        <xs:element name = "postcondition" type = "TCondition" minOccurs =
    "0" maxOccurs = "unbounded"></xs:element>
20    </xs:sequence>
      <xs:attribute name = "id" type = "xs:ID" use = "required"></xs:attribute>
      <xs:attribute name = "title" type = "xs:string"></xs:attribute>
      <xs:attribute name = "skipOS" type = "TSkipOS"></xs:attribute>
      <xs:attribute name = "runmode" type = "TRunmode"></xs:attribute>
25  </xs:complexType>
```

Fig. 7

```
    <xs:complexType name = "TTestCase">
30    <xs:sequence>
        <xs:element name = "description" type = "TDescription" minOccurs =
    "0"></xs:element>
        <xs:element name = "category" type = "TCategory" minOccurs = "0" maxOccurs
    = "unbounded"></xs:element>
35      <xs:element name = "paramGroup" type = "TParamGroup" minOccurs = "0"></
    xs:element>
        <xs:choice minOccurs = "0">
          <xs:element name = "specification" type = "TSpecification" maxOccurs =
    "unbounded"></xs:element>
40        <xs:element name = "instruction" type = "TInstruction" maxOccurs =
    "unbounded"></xs:element>
        </xs:choice>
      </xs:sequence>
45    <xs:attribute name = "id" type = "xs:ID" use = "required"></xs:attribute>
      <xs:attribute name = "priority" type = "TPriority" default = "medium"></xs:attribute>
      <xs:attribute name = "type" type = "TTestCaseType" default = "automatic"></
    xs:attribute>
      <xs:attribute name = "status" type = "TImplementationState" default =
50  "implemented"></xs:attribute>
      <xs:attribute name = "skipOS" type = "TSkipOS"></xs:attribute>
    </xs:complexType>
```

Fig. 8A

```
   <?xml version = "1.0" encoding = "UTF-8"?>
   <xs:schema xmlns:tsd = "http://namespaces.softwareag.com/tamino/TaminoSchemaDefinition" xmlns:xs
5  = "http://www.w3.org/2001/XMLSchema">
    <xs:annotation>
     <xs:appinfo>
      <tsd:schemaInfo name = "tcRInfo">
       <tsd:collection name = "Transparency"></tsd:collection>
10     <tsd:doctype name = "tcRInfo"></tsd:doctype>
      </tsd:schemaInfo>
     </xs:appinfo>
    </xs:annotation>
    <xs:element name = "tcRInfo">
15   <xs:annotation>
      <xs:appinfo>
       <tsd:elementInfo>
        <tsd:logical>
         <tsd:trigger>
20        <tsd:onDelete type = "action">Qett.tcRInfoDelete</tsd:onDelete>
          <tsd:onInsert type = "action">Qett.tcRInfoInsert</tsd:onInsert>
          <tsd:onUpdate type = "action">Qett.tcRInfoUpdate</tsd:onUpdate>
         </tsd:trigger>
        </tsd:logical>
25      </tsd:elementInfo>
      </xs:appinfo>
     </xs:annotation>
     <xs:complexType>
30    <xs:sequence>
       <xs:choice minOccurs = "0">
        <xs:element name = "testspec">
         <xs:complexType>
          <xs:attribute name = "id" type = "xs:string" use = "required">
35         <xs:annotation>
            <xs:appinfo>
             <tsd:attributeInfo>
              <tsd:physical>
               <tsd:native>
                <tsd:index>
40               <tsd:standard></tsd:standard>
                </tsd:index>
               </tsd:native>
              </tsd:physical>
             </tsd:attributeInfo>
45         </xs:appinfo>
           </xs:annotation>
          </xs:attribute>
         </xs:complexType>
        </xs:element>
```

Fig. 8B

```
50      <xs:element name = "requirement">
          <xs:complexType>
            <xs:attribute name = "id" type = "xs:string" use = "required">
              <xs:annotation>
                <xs:appinfo>
55                <tsd:attributeInfo>
                    <tsd:physical>
                      <tsd:native>
                        <tsd:index>
                          <tsd:standard></tsd:standard>
60                      </tsd:index>
                      </tsd:native>
                    </tsd:physical>
                  </tsd:attributeInfo>
                </xs:appinfo>
65            </xs:annotation>
            </xs:attribute>
          </xs:complexType>
        </xs:element>
      </xs:choice>
70    <xs:element name = "target">
        <xs:complexType>

<xs:sequence>
          <xs:element name = "platform">
            <xs:complexType>
5             <xs:attribute name = "osName" type = "xs:string" use = "required">
                <xs:annotation>
                  <xs:appinfo>
                    <tsd:attributeInfo>
                      <tsd:physical>
10                      <tsd:native>
                          <tsd:index>
                            <tsd:standard></tsd:standard>
                          </tsd:index>
                        </tsd:native>
15                      </tsd:physical>
                    </tsd:attributeInfo>
                  </xs:appinfo>
                </xs:annotation>
              </xs:attribute>
20            <xs:attribute name = "osVersion" type = "xs:string" use = "required">
                <xs:annotation>
                  <xs:appinfo>
                    <tsd:attributeInfo>
25                    <tsd:physical>
                        <tsd:native>
                          <tsd:index>
                            <tsd:standard></tsd:standard>
```

Fig. 8C

```
                    </tsd:index>
30                </tsd:native>
                </tsd:physical>
              </tsd:attributeInfo>
            </xs:appinfo>
          </xs:annotation>
        </xs:attribute>
35    </xs:complexType>
    </xs:element>
    <xs:element name = "product">
      <xs:annotation>
40      <xs:appinfo>
          <tsd:elementInfo>
            <tsd:physical>
              <tsd:native>
                <tsd:index>
45                <tsd:standard></tsd:standard>
                </tsd:index>
              </tsd:native>
            </tsd:physical>
          </tsd:elementInfo>
50      </xs:appinfo>
      </xs:annotation>
      <xs:complexType>
        <xs:simpleContent>
          <xs:extension base = "xs:string">
55          <xs:attribute name = "version" type = "xs:string" use = "required">
              <xs:annotation>
                <xs:appinfo>
                  <tsd:attributeInfo>
60                <tsd:physical>
                    <tsd:native>
                      <tsd:index>
                        <tsd:standard></tsd:standard>
                      </tsd:index>
65                  </tsd:native>
                  </tsd:physical>
                </tsd:attributeInfo>
              </xs:appinfo>
            </xs:annotation>
70        </xs:attribute>
          </xs:extension>
        </xs:simpleContent>
      </xs:complexType>

</xs:element>
    </xs:sequence>
    <xs:attribute name = "name" type = "xs:string" use = "required"></xs:attribute>
5   </xs:complexType>
  </xs:element>
  <xs:element name = "filter" minOccurs = "0">
    <xs:complexType>
```

Fig. 8D

```
<xs:all>
  <xs:element name = "priority" minOccurs = "0">
    <xs:complexType>
      <xs:attribute name = "value" type = "xs:string" use = "required"></xs:attribute>
    </xs:complexType>
  </xs:element>
  <xs:element name = "category" minOccurs = "0">
    <xs:complexType>
      <xs:attribute name = "name" type = "xs:string" use = "required"></xs:attribute>
      <xs:attribute name = "value" type = "xs:string"></xs:attribute>
    </xs:complexType>
  </xs:element>
  <xs:element name = "testcaseId" minOccurs = "0">
    <xs:complexType>
      <xs:attribute name = "pattern" type = "xs:string" use = "required"></xs:attribute>
    </xs:complexType>
  </xs:element>
  <xs:element name = "failedTests" minOccurs = "0">
    <xs:complexType>
      <xs:attribute name = "version" type = "xs:string" use = "required"></xs:attribute>
    </xs:complexType>
  </xs:element>
  <xs:element name = "manual" minOccurs = "0"></xs:element>
  <xs:element name = "status" minOccurs = "0">
    <xs:complexType>
      <xs:attribute name = "value" type = "xs:string" use = "required"></xs:attribute>
    </xs:complexType>
  </xs:element>
</xs:all>
      </xs:complexType>
    </xs:element>
    <xs:element name = "envinfo" minOccurs = "0">
      <xs:complexType mixed = "true">
        <xs:choice minOccurs = "0" maxOccurs = "unbounded">
          <xs:any processContents = "skip" minOccurs = "0"></xs:any>
        </xs:choice>
      </xs:complexType>
    </xs:element>
  </xs:sequence>
  <xs:attribute name = "key" type = "xs:string">
    <xs:annotation>
      <xs:appinfo>
        <tsd:attributeInfo>
          <tsd:physical>
            <tsd:native>
              <tsd:index>
                <tsd:standard></tsd:standard>
```

Fig. 8E

```
            </tsd:index>
           </tsd:native>
          </tsd:physical>
        </tsd:attributeInfo>
65     </xs:appinfo>
      </xs:annotation>
     </xs:attribute>
    </xs:complexType>
   </xs:element>
70 </xs:schema>
```

Fig. 9A

```
   <?xml version = "1.0" encoding = "UTF-8"?>
   <xs:schema xmlns:tsd = "http://namespaces.softwareag.com/tamino/TaminoSchemaDefinition"
5  xmlns:xs = "http://www.w3.org/2001/XMLSchema">
    <xs:annotation>
     <xs:appinfo>
      <tsd:schemaInfo name = "testresult">
       <tsd:collection name = "Transparency"></tsd:collection>
10     <tsd:doctype name = "tcResult"></tsd:doctype>
      </tsd:schemaInfo>
     </xs:appinfo>
    </xs:annotation>
    <xs:element name = "tcResult">
15   <xs:complexType>
      <xs:sequence>
       <xs:element name = "target">
        <xs:complexType>
         <xs:sequence>
20        <xs:element name = "platform">
           <xs:complexType>
            <xs:attribute name = "osName" type = "xs:string" use = "required">
             <xs:annotation>
25            <xs:appinfo>
               <tsd:attributeInfo>
                <tsd:physical>
                 <tsd:native>
                  <tsd:index>
30                 <tsd:standard></tsd:standard>
                  </tsd:index>
                 </tsd:native>
                </tsd:physical>
               </tsd:attributeInfo>
35            </xs:appinfo>
             </xs:annotation>
            </xs:attribute>
```

Fig. 9B

```
     <xs:attribute name = "osVersion" type = "xs:string" use = "required">
40     <xs:annotation>
         <xs:appinfo>
           <tsd:attributeInfo>
            <tsd:physical>
             <tsd:native>
45             <tsd:index>
                 <tsd:standard></tsd:standard>
               </tsd:index>
             </tsd:native>
            </tsd:physical>
50         </tsd:attributeInfo>
         </xs:appinfo>
       </xs:annotation>
     </xs:attribute>
     </xs:complexType>
55   </xs:element>
     <xs:element name = "product">
       <xs:annotation>
         <xs:appinfo>
           <tsd:elementInfo>
60           <tsd:physical>
              <tsd:native>
                <tsd:index>
                  <tsd:standard></tsd:standard>
                </tsd:index>
              </tsd:native>
65            </tsd:physical>
           </tsd:elementInfo>
         </xs:appinfo>
       </xs:annotation>
70     <xs:complexType>
         <xs:simpleContent>

<xs:extension base = "xs:string">
             <xs:attribute name = "version" type = "xs:string" use = "required">
 5            <xs:annotation>
                <xs:appinfo>
                  <tsd:attributeInfo>
                   <tsd:physical>
                    <tsd:native>
                     <tsd:index>
10                     <tsd:standard></tsd:standard>
```

Fig. 9C

```
                </tsd:index>
              </tsd:native>
            </tsd:physical>
          </tsd:attributeInfo>
15        </xs:appinfo>
        </xs:annotation>
      </xs:attribute>
    </xs:extension>
   </xs:simpleContent>
20  </xs:complexType>
  </xs:element>
 </xs:sequence>
 <xs:attribute name = "name" type = "xs:string" use = "required"></xs:attribute>
25 </xs:complexType>
</xs:element>
<xs:element name = "startTime" minOccurs = "0">
  <xs:complexType>
30   <xs:attribute name = "value" type = "xs:dateTime" use = "required"></xs:attribute>
  </xs:complexType>
</xs:element>
<xs:element name = "output" minOccurs = "0" maxOccurs = "unbounded">
  <xs:complexType>
35   <xs:simpleContent>
      <xs:extension base = "xs:string">
        <xs:attribute name = "command" type = "xs:string"></xs:attribute>
      </xs:extension>
    </xs:simpleContent>
40   </xs:complexType>
</xs:element>
<xs:element name = "endTime" minOccurs = "0">
  <xs:complexType>
45   <xs:attribute name = "value" type = "xs:dateTime" use = "required"></xs:attribute>
  </xs:complexType>
</xs:element>
<xs:element name = "duration" minOccurs = "0">
  <xs:complexType>
50   <xs:attribute name = "value" type = "xs:duration"></xs:attribute>
  </xs:complexType>
</xs:element>
<xs:element name = "status" type = "xs:string"></xs:element>
<xs:element name = "category" minOccurs = "0" maxOccurs = "unbounded">
55   <xs:complexType>
    <xs:attribute name = "name" type = "xs:string" use = "required">
      <xs:annotation>
        <xs:appinfo>
          <tsd:attributeInfo>
60           <tsd:physical>
            <tsd:native>
              <tsd:index>
                <tsd:standard></tsd:standard>
```

Fig. 9D

```
                </tsd:index>
                </tsd:native>
               </tsd:physical>
              </tsd:attributeInfo>
             </xs:appinfo>
            </xs:annotation>
           </xs:attribute>
           <xs:attribute name = "value" type = "xs:string">
            <xs:annotation>
             <xs:appinfo>

<tsd:attributeInfo>
               <tsd:physical>
                <tsd:native>
                 <tsd:index>
                  <tsd:standard></tsd:standard>
                 </tsd:index>
                </tsd:native>
               </tsd:physical>
              </tsd:attributeInfo>
             </xs:appinfo>
            </xs:annotation>
           </xs:attribute>
          </xs:complexType>
         </xs:element>
        </xs:sequence>
        <xs:attribute name = "tcId" type = "xs:string" use = "required">
         <xs:annotation>
          <xs:appinfo>
           <tsd:attributeInfo>
            <tsd:physical>
             <tsd:native>
              <tsd:index>
               <tsd:standard></tsd:standard>
              </tsd:index>
             </tsd:native>
            </tsd:physical>
           </tsd:attributeInfo>
          </xs:appinfo>
         </xs:annotation>
        </xs:attribute>
        <xs:attribute name = "key" type = "xs:string">
         <xs:annotation>
          <xs:appinfo>
           <tsd:attributeInfo>
            <tsd:physical>
             <tsd:native>
              <tsd:index>
```

Fig. 9E

```
                <tsd:standard></tsd:standard>
              </tsd:index>
40           </tsd:native>
            </tsd:physical>
          </tsd:attributeInfo>
        </xs:appinfo>
       </xs:annotation>
45     </xs:attribute>
     </xs:complexType>
   </xs:element>
 </xs:schema>
```

Fig. 10A

```
  <?xml version = "1.0" encoding = "UTF-8"?>
5 <xs:schema xmlns:tsd = "http://namespaces.softwareag.com/tamino/TaminoSchemaDefinition"
   xmlns:xs = "http://www.w3.org/2001/XMLSchema">
     <xs:annotation>
      <xs:appinfo>
10     <tsd:schemaInfo name = "testspec">
         <tsd:collection name = "Transparency"></tsd:collection>
         <tsd:doctype name = "testspec">
          <tsd:logical>
            <tsd:content>closed</tsd:content>
15        </tsd:logical>
         </tsd:doctype>
       </tsd:schemaInfo>
      </xs:appinfo>
     </xs:annotation>
20   <xs:element name = "testspec" type = "TTestspec"></xs:element>

- Definition TTestSpec see Fig. 5 -

- Definition TScenario see Fig. 6 -
25
            - Definition TTestCase see Fig. 7 -

<xs:complexType name = "TDescription" mixed = "true">
     <xs:choice minOccurs = "0" maxOccurs = "unbounded">
30    <xs:element name = "plaintext" type = "xs:string"></xs:element>
      <xs:element name = "list" type = "TList"></xs:element>
     </xs:choice>
    </xs:complexType>
```

Fig. 10B

```
    <xs:complexType name = "TCategory">
35    <xs:attribute name = "name" type = "xs:string" use = "required"></xs:attribute>
      <xs:attribute name = "value" type = "xs:string"></xs:attribute>
    </xs:complexType>
    <xs:complexType name = "TRevisionHistory">
40    <xs:sequence>
        <xs:element name = "revision" type = "TRevision" maxOccurs = "unbounded"></xs:element>
      </xs:sequence>
    </xs:complexType>
45  <xs:complexType name = "TCondition" mixed = "true">
      <xs:sequence>
        <xs:element name = "description" type = "TDescription" minOccurs = "0"></xs:element>
50      <xs:element name = "application" type = "TApplication" minOccurs = "0" maxOccurs =
    "unbounded"></xs:element>
      </xs:sequence>
      <xs:attribute name = "defined" type = "TDefined"></xs:attribute>
      <xs:attribute name = "perform" type = "TPerform" default = "once"></xs:attribute>
55    <xs:attribute name = "skipOS" type = "TSkipOS"></xs:attribute>
    </xs:complexType>
    <xs:complexType name = "TSpecification" mixed = "true">
      <xs:sequence>
        <xs:element name = "application" type = "TApplication"></xs:element>
60    </xs:sequence>
      <xs:attribute name = "defined" type = "TDefined"></xs:attribute>
    </xs:complexType>
    <xs:complexType name = "TInstruction">
      <xs:sequence>
65      <xs:element name = "step" type = "TStep" maxOccurs = "unbounded"></xs:element>
      </xs:sequence>
    </xs:complexType>

<xs:complexType name = "TStep">
      <xs:sequence>
        <xs:element name = "action"></xs:element>
        <xs:element name = "check" type = "TCheck" minOccurs = "0"></xs:element>
5     </xs:sequence>
    </xs:complexType>
    <xs:complexType name = "TCheck" mixed = "true">
      <xs:attribute name = "href" type = "xs:string"></xs:attribute>
    </xs:complexType>
10  <xs:complexType name = "TApplication" mixed = "true">
      <xs:choice minOccurs = "0" maxOccurs = "unbounded">
        <xs:element name = "startParam" type = "TStartParam"></xs:element>
        <xs:element name = "self" type = "TSelf"></xs:element>
      </xs:choice>
15    <xs:attribute name = "fileExtension" type = "xs:string"></xs:attribute>
      <xs:attribute name = "expect" type = "TExpect" default = "success"></xs:attribute>
```

Fig. 10C

```
    </xs:complexType>
    <xs:complexType name = "TRevision" mixed = "true">
20    <xs:attribute name = "number" type = "xs:decimal"></xs:attribute>
      <xs:attribute name = "date" type = "xs:date"></xs:attribute>
      <xs:attribute name = "author" type = "xs:string"></xs:attribute>
      <xs:attribute name = "conceptStatus" type = "TConceptStatus" default = "draft"></xs:attribute>
25    <xs:attribute name = "requirement" type = "xs:positiveInteger"></xs:attribute>
    </xs:complexType>
    <xs:complexType name = "TList">
      <xs:sequence>
30      <xs:element name = "item" type = "xs:string" maxOccurs = "unbounded"></xs:element>
      </xs:sequence>
    </xs:complexType>
    <xs:complexType name = "TSelf"></xs:complexType>
    <xs:complexType name = "TStartParam">
35    <xs:attribute name = "name" type = "xs:string" use = "required"></xs:attribute>
    </xs:complexType>
    <xs:simpleType name = "TPriority">
      <xs:restriction base = "xs:string">
40      <xs:enumeration value = "low"></xs:enumeration>
        <xs:enumeration value = "medium"></xs:enumeration>
        <xs:enumeration value = "high"></xs:enumeration>
      </xs:restriction>
    </xs:simpleType>
45  <xs:simpleType name = "TTestCaseType">
      <xs:restriction base = "xs:string">
        <xs:enumeration value = "manual"></xs:enumeration>
        <xs:enumeration value = "automatic"></xs:enumeration>
      </xs:restriction>
50  </xs:simpleType>
    <xs:simpleType name = "TImplementationState">
      <xs:restriction base = "xs:string">
        <xs:enumeration value = "planned"></xs:enumeration>
55      <xs:enumeration value = "implemented"></xs:enumeration>
        <xs:enumeration value = "suspended"></xs:enumeration>
      </xs:restriction>
    </xs:simpleType>
    <xs:simpleType name = "TPerform">
      <xs:restriction base = "xs:string">
60      <xs:enumeration value = "once"></xs:enumeration>
        <xs:enumeration value = "multiple"></xs:enumeration>
      </xs:restriction>
    </xs:simpleType>
```

Fig. 10D

```
     <xs:simpleType name = "TDefined">
65     <xs:restriction base = "xs:string">
         <xs:enumeration value = "inline"></xs:enumeration>
         <xs:enumeration value = "extern"></xs:enumeration>
       </xs:restriction>
     </xs:simpleType>
70   <xs:simpleType name = "TConceptStatus">
       <xs:restriction base = "xs:string">
         <xs:enumeration value = "draft"></xs:enumeration>
         <xs:enumeration value = "review"></xs:enumeration <xs:enumeration value = "accepted"></xs:enumeration>
       </xs:restriction>
     </xs:simpleType>
     <xs:simpleType name = "TExpect">
5      <xs:restriction base = "xs:string">
         <xs:enumeration value = "success"></xs:enumeration>
         <xs:enumeration value = "fail"></xs:enumeration>
         <xs:enumeration value = "nothing"></xs:enumeration>
       </xs:restriction>
10   </xs:simpleType>
     <xs:simpleType name = "TSkipOS">
       <xs:restriction base = "xs:string">
         <xs:enumeration value = "WINDOWS"></xs:enumeration>
         <xs:enumeration value = "WINDOWS UNIX"></xs:enumeration>
15     <xs:enumeration value = "WINDOWS UNIX VMS"></xs:enumeration>
         <xs:enumeration value = "WINDOWS VMS"></xs:enumeration>
         <xs:enumeration value = "UNIX"></xs:enumeration>
         <xs:enumeration value = "UNIX VMS"></xs:enumeration>
         <xs:enumeration value = "UNIX VMS WINDOWS"></xs:enumeration>
20     <xs:enumeration value = "VMS"></xs:enumeration>
       </xs:restriction>
     </xs:simpleType>
     <xs:simpleType name = "TRunmode">
       <xs:restriction base = "xs:string">
25     <xs:enumeration value = "sequential"></xs:enumeration>
         <xs:enumeration value = "parallel"></xs:enumeration>
         <xs:enumeration value = "userdefined"></xs:enumeration>
       </xs:restriction>
     </xs:simpleType>
```

Fig. 10E

```
30  <xs:complexType name = "TParamGroup">
      <xs:choice>
        <xs:element name = "paramGroup" type = "TParamGroup" maxOccurs = "unbounded"></xs:element>
35      <xs:element name = "param" type = "TParam" maxOccurs = "unbounded"></xs:element>
      </xs:choice>
      <xs:attribute name = "name" type = "xs:string" use = "required"></xs:attribute>
      <xs:attribute name = "value" type = "xs:string"></xs:attribute>
40    <xs:attribute name = "comment" type = "xs:string"></xs:attribute>
    </xs:complexType>
    <xs:complexType name = "TParam">
      <xs:simpleContent>
        <xs:extension base = "xs:string">
45        <xs:attribute name = "name" type = "xs:string" use = "required"></xs:attribute>
          <xs:attribute name = "value" type = "xs:string"></xs:attribute>
          <xs:attribute name = "comment" type = "xs:string"></xs:attribute>
        </xs:extension>
50    </xs:simpleContent>
    </xs:complexType>
  </xs:schema>
```

SYSTEM AND METHOD FOR TESTING A SOFTWARE PRODUCT

PRIORITY CLAIM

This application claims benefit of priority of European application no. 08 010 593.5 titled "System and Method for Testing a Software Product", filed Jun. 11, 2008, and whose inventors are Julius Geppert and Ralf Ruth.

INCORPORATED BY REFERENCE

European application no. 08 010 593.5 titled "System and Method for Testing a Software Product", filed Jun. 11, 2008, and whose inventors are Julius Geppert and Ralf Ruth, is hereby incorporated by reference in its entirety as though fully and completely set forth herein.

1. TECHNICAL FIELD

The present invention relates to a system and method for testing a software product.

2. DESCRIPTION OF THE RELATED ART

In many technical fields, the reliability of the operation of a software product is of crucial importance. For example software for the automotive or medical industry should be fully reliable, since any malfunction or failure may have life-threatening consequences. The same applies to other safety-related environments. An incorrectly operating or failing software product is also problematic for other fields of technology such as business enterprise systems, wherein the software serves to facilitate the management of a company.

In order to ensure the proper functioning of a software product, the software product should be systematically tested. A common approach is to define the scope of the software product and the requirements in a product specification and to derive test cases which verify if the requirements are met by the software product. Furthermore, not only the finished product has to be tested, but also intermediate stages of the software product throughout its development.

Since a software product is typically rather complex and may lead to thousands of requirements and even more test cases, an efficient test management is crucial in order to keep an overview of the test progress and to ensure that all requirements are tested thoroughly, i.e. that an adequate test coverage is achieved.

U.S. Pat. No. 7,174,541 discloses a method and system for testing a feature of a software application, wherein test data is incorporated into a test script and sent to the application feature under test. After the execution of the test script, the application's response is compared to predicted proper outputs in order to determine if the application feature passed the test.

U.S. Pat. No. 7,210,066 discloses a method for analyzing the test coverage of a software application. The method includes assertion documents which contain assertions tagged to the contents of a specification, and further static files defining tests of these assertions. The test coverage of the specification is determined by searching through all related assertions and their corresponding tests upon request.

However, the above described approaches to running test operations lack an efficient way to align contents of requirement specifications to the test specifications, especially when different test methods have to be used for the same requirement and different requirements are to be tested with the same test methods. It is further a problem well known in the prior art to keep an overview of the test coverage when facing changing requirements during development. Lastly, when a new version of an existing software product is developed, there is a demand to efficiently reuse the existing tests developed for the previous product version.

In view of the above, it is the technical problem underlying the present invention to provide a test system and method which efficiently supports the planning, implementing and the execution of tests of a software product to ensure adequate test coverage of the software product under development, thereby at least partly overcoming the above explained disadvantages of the prior art.

3. SUMMARY OF THE INVENTION

According to one aspect, an embodiment of the invention relates to a system for testing at least one software product as defined in claim 1 of the present application. In one embodiment, the system comprises:

a. a requirement loader adapted for loading a plurality of requirements on the software product into a database; and b. a test specification loader adapted for loading a plurality of test specifications for the software product into the database, each test specification being related to one or more of the requirements, c. wherein the test specification loader is further adapted for generating during loading of a test specification a virtual test specification in the database for each of the one or more related requirements, the virtual test specification comprising all test specifications for the respective requirement on the software product stored in the database.

In one embodiment, the system is further adapted to load test result data into the database. Test results are preferably loaded for each test run, i.e., for each execution of a test specification and may include statistical metadata to accelerate queries and overview presentations. Alternatively, a test run may also comprise the execution of a virtual test specification for a specific requirement.

Accordingly, one embodiment integrates data for software product requirements, test specifications created for these requirements and results from the execution of the tests into a database and thus supports the planning, implementation and execution of tests. The system may support statements about the test implementation progress as well as product quality statements, such as test coverage. Further, the system creates virtual test specifications indicating which requirements are tested by which test specifications, thus allowing the test engineer to efficiently gain an overview of the test coverage. Furthermore, since the virtual test specifications can be generated and updated each time a new or altered test specification is loaded into the database, the time and processing power for outputting a virtual test specification to a user is reduced to a minimum, since the most updated version thereof is already present in the database. Given the huge amount of data when developing complex products, the described embodiment of the invention significantly increases the reliability and efficiency of the test management.

The test result data may be written into a spool directory so that the availability of this data is independent of database shutdowns or network problems. Additionally, this approach ensures that only data of completed test runs is loaded into the database.

Test cases are the atomic units of a test specification and may verify one specific feature each. According to a further aspect of the described embodiment of the invention, several test cases may be grouped into a scenario. A plurality of scenarios may in turn be part of another scenario. Finally, one or more scenarios may be grouped into a test specification. Thus, a test specification combines all scenarios and therefore all test cases for one topic (e.g. one sub product or a requirement).

Furthermore, statistical and descriptive metadata may be generated and added to the database during loading of test specifications and/or test results in order to accelerate queries. The metadata may, e.g., count the number of test cases per type, per status, per requirement and/or per test execution result.

The scenarios may further comprise preconditions and cleanup steps. A precondition can define actions to be done before execution of the scenario. If the precondition fails, no test is executed. A cleanup step can define actions to be done after execution of the scenario and may always be executed, even if the preconditions of the corresponding scenario fail.

According to another aspect, scenarios and test cases may comprise category properties. The element category is used to add name-value pairs to scenarios or test cases and enables the generation of test plans, i.e. the documentation of tests for a specific purpose (e.g. all tests for a specific requirement, all tests for known problems). The test specification loader propagates requirement information given by the category elements for scenarios to all contained scenarios/test cases to simplify queries for test cases belonging to a certain requirement. Furthermore, category elements may be used for special data like error tracking system numbers, as well as for arbitrary keys or key value pairs to be used for filtering purposes.

According to yet another aspect of an embodiment of the present invention, requirements may be used to drive one specific project for one specific software product. For example a new version of a software product may be developed in a project separately from the last product version. The test specification loader may add information on the software product and the project to the test specification in the database by knowing from where it is loaded (e.g. because of the directory structure). As a result, the same test specification can be loaded for different projects, e.g. for regression tests, without the need to change the test specification outside the system.

In another aspect, input data, i.e. requirements, test specifications and/or test results are in XML format and stored in a native XML database. The requirements can be received e.g. from a requirement management tool that exports this data. The test results may be generated by a test runner that returns test result data in a specific XML format. This can be reached e.g. using appropriate XSLT style sheets. It should be appreciated that the database can be implemented in numerous ways, e.g. as one central database, or in a distributed database environment.

According to yet another aspect, the described system may be implemented by a computer program.

According to a further aspect of the present invention, a method is provided for testing a software product according to claim 11 of the present application. In one embodiment, the method comprises the steps of:
 a. loading a plurality of requirements on the software product into a database,
 b. loading a plurality of test specifications for the software product into the database, each test specification being related to one or more of the requirements; and
 c. generating during loading of a test specification a virtual test specification in the database for each of the one or more related requirements, the virtual test specification comprising all test specifications for the respective requirement on the software product stored in the database.

Accordingly, the virtual test specifications are generated when importing new or altered test specifications into the database, thus minimizing the processing power and the number of database queries when a user requests such a virtual test specification of a requirement.

According to another aspect of an embodiment of the invention, the method comprises the step of loading test result data into the database. Test results are preferably loaded for each test run, i.e. for each execution of a test specification and may include statistical and descriptive metadata to accelerate queries and overview presentations. The metadata may count the number of test cases per type, per status, per requirement and/or per test execution result. Alternatively, a test run may also comprise the execution of a virtual test specification for a specific requirement.

According to yet another aspect, the loading of requirements, test specifications and test results is done periodically, e.g. once per hour.

Further advantageous modifications of embodiments of the system and the method of the invention are defined in further dependent claims.

4. SHORT DESCRIPTION OF THE DRAWINGS

Figure 2:
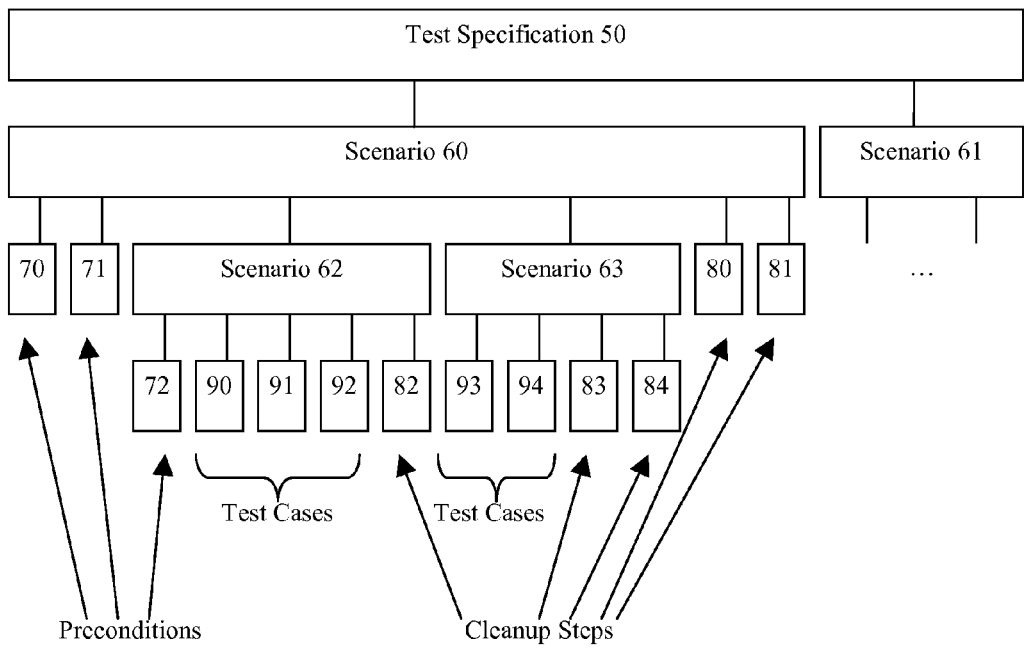
Figure 3:
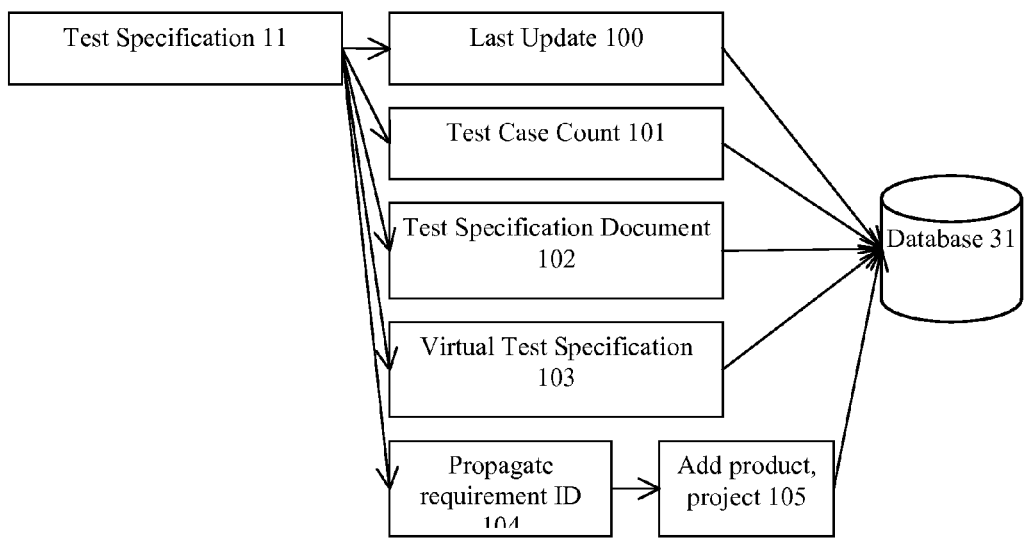

In the following detailed description, presently preferred embodiments of the invention are further described with reference to the following figures:

FIG. 1: An overview of the main parts of an embodiment of a system in accordance with the present invention;

FIG. 2: A schematic view of an exemplary test specification comprising scenarios, test cases, preconditions and cleanup steps;

FIG. 3: A detailed schematic view of the metadata generated by the test specification loader;

FIG. 4: A detailed schematic view of the metadata generated by the test result loader;

FIG. 5: An exemplary XML schema definition of the type TTestspec;

FIG. 6: An exemplary XML schema definition of the type TScenario;

FIG. 7: An exemplary XML schema definition of the type TTestCase;

FIGS. 8A-8E: An exemplary XML schema definition of the document type tcRInfo;

FIGS. 9A-9E: An exemplary XML schema definition of the document type tcResult; and FIGS. 10A-10E: A complete XML schema definition of the document type testspec.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

5. DETAILED DESCRIPTION OF EMBODIMENTS

In the following, an exemplary embodiment of the invention is described with respect to a test system 30 as schematically shown in FIG. 1. As can be seen, the test system 30 receives three types of input data by three data loaders: requirements 10 are loaded by a requirement loader 20, test specifications 11 are loaded by a test specification loader 21 and test results 12 are loaded by a test result loader 22 and stored in a database 31. The system further comprises an application 32, which produces various output documents like test specification documents 102, virtual test specifications 103 and further overview reports 40, which will be described in detail below.

The requirements 10 define the project for which the test implementation progress and quality via test results shall be measured. This data can be received e.g. from a requirement management tool (not shown in FIG. 1) that exports this data. It is assumed that requirements are given for a specific project of a specific software product.

The test results 12 are generated by a test runner (not depicted in FIG. 1) that returns test result data in a specific XML format defined by using for example appropriate XSLT style sheets. The processing of the test result data is described in more detail below.

The test specifications 11 define the tests to be executed for a given project. FIG. 2 depicts an example test specification 50, which is a representation of an input test specification 11 after it is loaded into the database 31. As can be seen in FIG. 2, the contents of a test specification 50 are organized in a tree structure. Test specifications 50 comprise scenarios 60, 61, which may themselves comprise further scenarios 62, 63. Scenarios may combine all test cases for one topic (e.g. a sub product or a requirement). In the example of FIG. 2, scenario 62 groups the test cases 90, 91 and 92. Consequently, the direct child nodes of a scenario may comprise scenarios or test cases, but preferably not both.

A scenario 60, . . . , 63 may further comprise preconditions 70, . . . , 72 and cleanup steps 80, . . . , 84. A precondition can define actions to be performed before the execution of the scenario, i.e. the contained test cases. If the precondition fails, none of the test cases are executed. A cleanup step can define actions to be performed after execution of the scenario and is preferably always executed, even if the corresponding preconditions fail. Preconditions and cleanup steps always belong to a scenario.

Finally, test cases 90, . . . , 94 are the "atomic units" of a test specification, i.e. a test case verifies one specific feature of a software product. It has a result "pass" or "fail", should be executable separately and further should be independent of the results of previous test cases.

It should be appreciated that the test specification structure in FIG. 2 is only one of a wide variety of embodiments. For example the number of child nodes of the tree structure is not limited to the depicted example.

Looking at the detailed XML schema definition of a test specification in FIG. 5, it is apparent that a test specification 50 further comprises the following properties: a required and unique ID (line 16), a short descriptive title (line 17) and a textual description (line 7). Lastly, a test specification 50 may comprise a revision history (line 13) to record changes and status information.

According to the XML schema definition of the type TScenario in FIG. 6, a scenario may comprise the following properties: a required and unique ID (line 21), a short descriptive title (line 22), a textual description (line 4) and any number of category elements (line 6). The latter are used to store, among others, the requirement ID, which determines the requirement which is tested by all test cases of this scenario, or a bug number from an error tracking system. The category data type is described in more detail below.

According to the XML schema definition of the type TTestCase in FIG. 7, a test case may comprise the following important properties: a required and unique ID (line 44), a type whose value may be "automatic" or "manual" (line 47), a status whose value may be "planned", "implemented" or "suspended" (line 49), a textual description (line 31), any number of category elements (line 33), e.g. a requirement ID, which determines the requirement which is tested by this test case, or a bug number from an error tracking system and finally any number of specifications (line 38) which determine how the test case is executed, e.g. via a command line.

The type category is used to add name-value pairs to scenarios or test cases. Despite its simple structure, it is a powerful data type that enables the generation of test plans, i.e. the documentation of tests for a specific purpose like all tests for a specific requirement or all tests for known problems. The properties of a category element are a required name and a value (see lines 34-38 of FIG. 10B).

The above data is loaded via the above mentioned loaders that may run periodically. The requirement data 10 has a simple structure and it is assumed that it stays relatively constant throughout a project. However, during the performance of a project, some requirements might be added or removed. This is considered by the requirement loader 20, e.g., to ensure that the addition/deletion of requirements for a project is propagated to the database 31.

During loading of the test specifications 11 and the test results 12, additional metadata is generated to accelerate the display of overviews etc. which is described in detail in the following.

Test Specification Loader 21

Test specifications 11 are created by a person who is responsible for testing. An XML editor may be used for creating an XML document according to the schema in FIGS. 10A-E. The test specification loader 21 may run as a scheduled task, e.g. once per hour, that searches for newer versions of already loaded test specifications 11 and for new test specifications 11 in a directory structure. The test specification loader 21 not only stores test specifications 11 in the database 31 as described above, but may execute one or more of the following additional tasks (see FIG. 3):

- it stores the date of the last update 100 of the test specification 50 to determine if a candidate test specification 11 has to be loaded or can be skipped;
- it counts test cases by type, by status, and by requirement and stores aggregated data in a separate document type TestCaseCount 101 to accelerate queries and overview presentations;
- it creates a test specification document 102 from the XML data via an appropriate style sheet to have fast access to a printable version of the test specification 50, which is loaded as non-XML document. The document 102 may be in PDF format;
- it creates a virtual test specification 103 for each requirement found in the original test specification 11 by querying all test specifications 50 of the same software product and project already in the database for test cases for this requirement in order to produce a virtual test specification 103 for each requirement, also loaded as non-XML documents. These documents 103 may also be in PDF format;
- it propagates the requirement ID 104 stored in the category elements of scenarios of the input test specification 11 to all contained scenarios/test cases to simplify queries for test cases belonging to a specific requirement;
- it adds project and product information 105 to the test specification 50 by knowing from where the original test specification 11 is loaded. As a result, the same test specification 11 can be loaded for different projects, e.g. for regression tests, without the need to change the test specification 11 outside the system.

Test Result Loader 22

Test results are preferably loaded for each test run, i.e. for each execution of a test specification 11. Some data (e.g. OS type, product version, or platform name) does not change during the test run and can thus be loaded once, while data for each test case can differ in its result as well as in the execution start and end time, which is important data. Therefore, two types of documents are preferably produced during a test run, as described below.

The test execution tool (not shown in FIG. 1) may first write documents for each test case into a spool directory. The reason for using such a spool directory instead of loading the data directly into the database 31 is that this approach is independent of database shutdowns or network problems, so that the test result data 12 is captured even if the database 31 is not available at the time of test execution. Additionally, this approach ensures that only data of completed test runs is loaded into the database 31, i.e. the file system serves as buffer.

Two types of documents are required as input for the test result loader 22 of the described embodiment: The first type of document (one document per test run) is structured according to the XML schema definition in FIGS. 8A-E. It comprises the properties testspec (which links to the respective test specification 11, p. 5, line 31), key (e.g. start time in milliseconds, p. 7, line 53) and information on the executing platform (p. 6, line 2), OS (p. 6, line 20) and product version (p. 6, line 38). This document may be used as a loader trigger, i.e. the test result loader 22 may load the relevant data when this document is available.

The second type of input document (one document for each result of one test case execution) is structured according to the XML schema definition in FIGS. 9A-E. It comprises the testRunInfo key (p. 10, line 31) of the corresponding first document to collect results from one run, the start (p. 9, line 27) and end time (p. 9, line 42), the result status (p. 9, line 53) (pass/fail/skipped due to precondition fails) and the reason for failure (P. 9, line 33), e.g. output of failing steps.

The second document type further has trigger functions defined (insert, update, delete), which trigger the test result loader 22 to perform the following tasks in order to keep the metadata up-to-date (see FIG. 4):

it counts test cases by type, by status, by requirement ID, by OS, by product version and by result (pass/fail/precondition fail) and stores aggregated data in a separate document type TestResultCount 110 to accelerate queries and overview presentations;

if the platform 111 used for test execution is not already stored in the respective document type, it is added to the list of available platforms;

if the product version 112 used for test execution is not already stored in the respective document type, it is added to the list of available product versions.

As an alternative to executing a complete test specification 11 during a test run as described above, a test run may also comprise the execution of a virtual test specification 103 for a specific requirement 10. In this case, the generated first type of document references the respective requirement ID (FIG. 8B, line 50).

Application 32

The application 32 may run inside an application server, e.g. Tomcat, and is used to display test data in different ways:

Test Specification

To display a single test specification document 102 a simple XQuery with product, project and test specification ID is issued and the complete test specification document 102, which has already been generated by the test specification loader 21 while loading the original test specification 11 into the database 31, is returned. Additionally, the document 102 may be converted to HTML via an XSLT style sheet.

To display a virtual test specification 103 for a given requirement, an XQuery with product, project and requirement ID is issued that returns all matching test cases with their enclosing scenario data including descriptions and preconditions/cleanup steps. The returned data is assembled into a (virtual) test specification document, which then is converted to HTML via an XSLT style sheet.

Further overview reports 40 may be generated by the application 32, which are described below.

Test Implementation Overview

There are two points of view to get an overview of the test implementation progress:

Test Specification View:
This view is gained via an XQuery with product and project ID, which returns data from the documents TestCaseCount 101 (test specification IDs, number of test cases in status "planned", "implemented" or "suspended") and the corresponding test specification titles.

Requirement View:
The XQuery to generate this view takes the product and project ID and sums up test case numbers from all TestCaseCount entries 101 for each contained requirement ID (requirement ID, number of test cases in status "planned", "implemented" or "suspended"). The requirement titles are received from the respective requirements (via their IDs).

Test Execution Overview

The same points of view apply to the overview of the test execution progress:

Test Specification View:
The test execution overview is gained via an XQuery with product and project ID, which returns data from TestResultCount 110 (test specification IDs, platform, product version, number of test cases with result "pass", "fail", "precondition fail" or "not executed") and the corresponding test specification titles (via their IDs).

Requirement View:
The XQuery to generate this view takes the product and project ID and sums up test case numbers per platform and per product version from all TestResultCount entries 110 for each contained requirement ID (requirement ID, number of test cases in status "planned", "implemented" or "suspended"). The requirement titles are received from the respective requirements (via their IDs).

Test Run Overview

The XQuery to generate this view serves as a filter on the documents TestRunInfo 13 for a specific software product and project. The input might contain any of platform, product version or test specification ID. The output is a list of all TestRunInfo objects 13 matching the given input criteria.

Test Run Details

For a single test run or several test runs for the same test specification 11 a list of detailed results (pass/fail/precondition failed/not executed) is generated. The XQuery takes a test specification ID (or requirement ID), one or more product versions, one or more test run IDs or platform information as input. The output may preferably only show the type of the result containing a link to a detailed result description (by executing the XQuery described below for each result).

Test Case Result Details

For a single result of a specific test case, identified by test run ID and test case ID, the output of the test case execution, which is stored in the TestResult document 12, is displayed. It is possible to have multiple results for a single test case if it consists of several steps (application calls).

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A non-transitory computer-readable memory medium storing program instructions for testing at least one software product, wherein the program instructions are executable to implement:
   a. a requirement loader adapted for loading a plurality of requirements on the software product into a database; and
   b. a test specification loader adapted for loading a plurality of test specifications for the software product into the database, each test specification being related to one or more of the requirements, wherein each test specification comprises one or more scenarios, and wherein each scenario comprises one or more test cases;
   c. wherein the test specification loader is further adapted for generating during loading of a test specification a virtual test specification in the database for each of the one or more related requirements, the virtual test specification comprising all test specifications for the respective requirement on the software product stored in the database, and wherein the virtual test specification for each respective requirement is generated by querying all test specifications for the software product already in the database for test cases for the requirement;
   wherein the program instructions are further executable to:
      execute at least one virtual test specification, including executing all test cases associated with the respective requirement; and
      load results from said executing into the database, wherein the results reference the respective requirement.

2. The non-transitory computer-readable memory medium of claim 1, further comprising a test result loader adapted for loading a plurality of test results corresponding to an execution of one of the test specifications or one of the virtual test specifications into the database; each test result being related to the respective test specification or the respective requirement of the virtual test specification.

3. The non-transitory computer-readable memory medium of claim 2, wherein the test results are first loaded into a spool directory and are subsequently loaded into the database when the execution of the test specification is completed.

4. The non-transitory computer-readable memory medium of claim 1, wherein at least one scenario comprises one or more further scenarios.

5. The non-transitory computer-readable memory medium of claim 4, wherein a scenario comprises at least one precondition and/or at least one cleanup step; wherein a precondition defines actions to be done before execution of the scenario and a cleanup step defines actions to be done after execution of the scenario.

6. The non-transitory computer-readable memory medium of claim 4, wherein the scenarios and test cases comprise category properties and the test specification loader is further adapted for propagating one or more of the category properties of the at least one scenario to the one or more comprised test cases when loading the test specification into the database.

7. The non-transitory computer-readable memory medium of claim 1, wherein the test specification loader and the test result loader are further adapted for generating statistical metadata, comprising the number of test cases per type, per status, per requirement and/or per test execution result, and for storing the statistical metadata in the database separately from the test specifications and the test results in the database.

8. The non-transitory computer-readable memory medium of claim 1, wherein the requirements are related to a plurality of projects for the software product and wherein the test specification loader is further adapted for adding information on the corresponding project and software product to the test specification in the database when loading the test specification into the database.

9. The non-transitory computer-readable memory medium of claim 1, wherein at least one of the requirements, the test specifications or the test results are stored as XML data of the database.

10. The non-transitory computer-readable memory medium of claim 1, wherein the requirements, the test specifications and the test results are stored as XML data of the database.

11. A method of testing a software product comprising the steps of:
   a. loading a plurality of requirements on the software product into a database;
   b. loading a plurality of test specifications for the software product into the database, each test specification being related to one or more of the requirements, wherein each test specification comprises one or more scenarios, and wherein each scenario comprises one or more test cases;
   c. generating during loading of a test specification a virtual test specification in the database for each of the one or more related requirements, the virtual test specification comprising all test specifications for the respective requirement on the software product stored in the database, and wherein the virtual test specification for each respective requirement is generated by querying all test specifications for the software product already in the database for test cases for the requirement;
   executing at least one virtual test specification, including executing all test cases associated with the respective requirement; and
   load results from said executing into the database, wherein the results reference the respective requirement.

12. The method of claim 11, further comprising loading a plurality of test results corresponding to an execution of one of the test specifications or one of the virtual test specifications into the database; each test result being related to the respective test specification or the respective requirement of the virtual test specification.

13. The method of claim 11, further comprising generating statistical metadata, comprising the number of test cases per type, per status, per requirement and/or per test execution result during loading the test specifications and/or test results, and of storing the statistical metadata in the database separately from the test specifications and test results in the database.

14. The method of claim 11, further comprising propagating one or more of the category properties of the at least one scenario to the one or more comprised test cases when loading the test specification into the database.

15. The method of claim 11, wherein the loading of requirements, test specifications and test results is done periodically.

* * * * *